Jan. 22, 1952 A. BAJROVIC 2,583,248
PERMANENT CORE
Filed Sept. 27, 1949 3 Sheets-Sheet 1
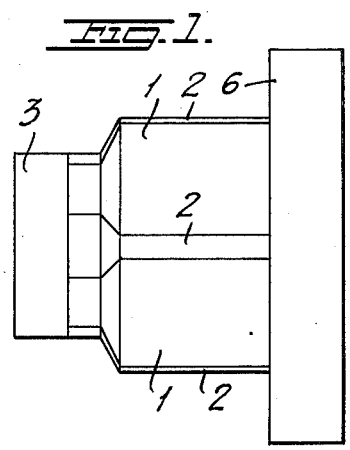
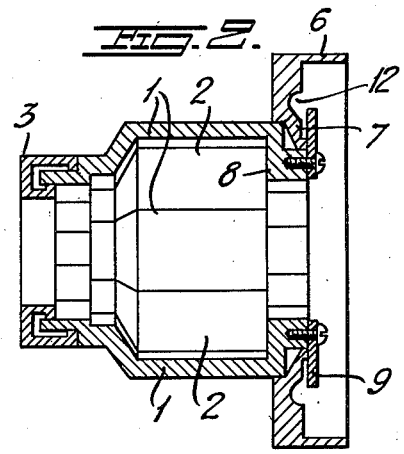
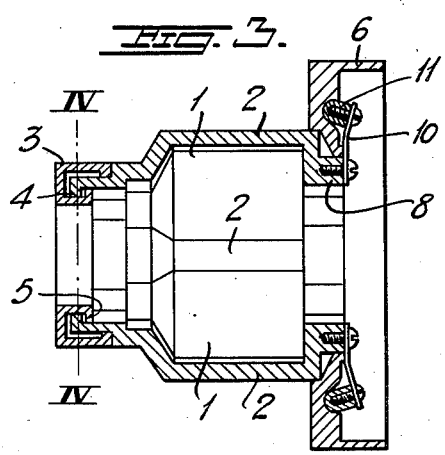
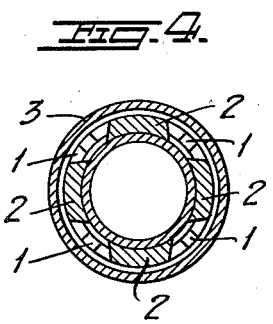
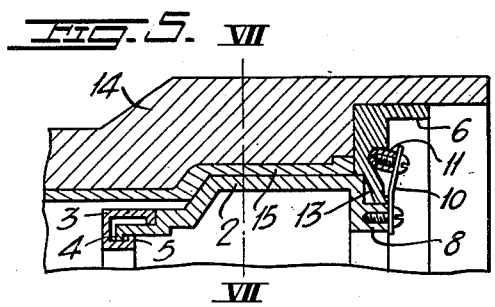
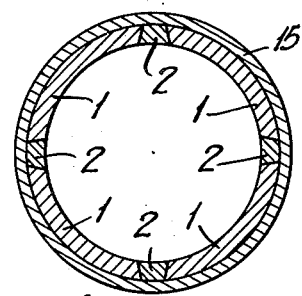
Inventor
Alexander Bajrovic
by Sommers & Young
Attorneys Jan. 22, 1952     A. BAJROVIC     2,583,248
PERMANENT CORE Filed Sept. 27, 1949     3 Sheets-Sheet 2

Inventor
Alexander Bajrovic
by Sommers & Young
Attorneys

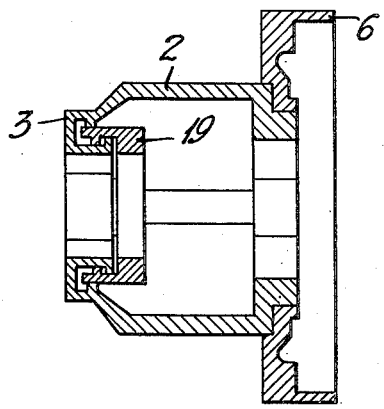
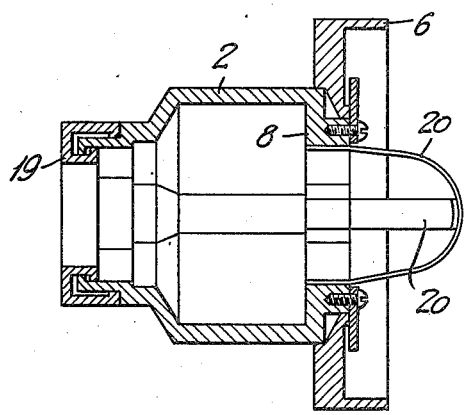
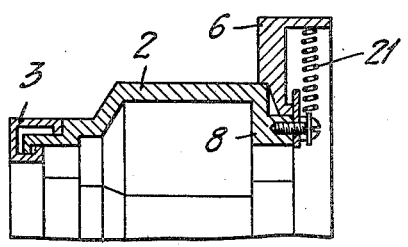
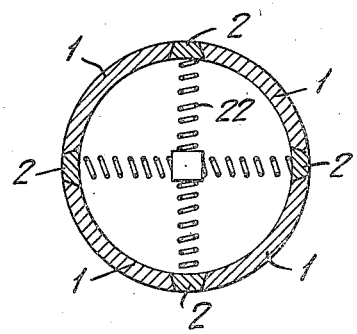

Patented Jan. 22, 1952

2,583,248

UNITED STATES PATENT OFFICE 2,583,248

PERMANENT CORE

Alexander Bajrovic, Akers Styckebruk, Sweden

Application September 27, 1949, Serial No. 118,120
In Sweden July 2, 1949

2 Claims. (Cl. 22—166)

Hollow castings are produced, as a rule, around a core made of sand and various kinds of binding materials and for the rest of such a nature as to be capable of resisting the pressure exerted by the cast mass during the casting operation, while at the same time it should be so elastic as to be capable of yielding according as the casting is getting cool and contracts around the core. Moreover, the core should be easily removable after the casting cools. Such a core can only be used one time and for each casting a new core must be made.

When a plurality of castings should be produced which require cores of one and the same size it is desirable from economical point of view to use a core of permanent character which may be used several times. In other cases, as for instance, in centrifugal casting operations, where the core is subjected to heavy stresses during the rotation, it is also desirable to get a core of maximum strength which cannot be obtained under all conditions in case of sand cores without making same of such a hardness as to cause the casting to burst owing to its contraction around the core. In other cases, on the contrary, a rapid cooling of the casting around the core may be desired, as for instance, when the casting is to be hardened while remaining in a chill mould.

In all these cases above referred to as well as in similar cases it is, therefore, desirable to get a metallic core which for the sake of saving material should be hollow; such a core, however, suffers from the drawback that it cannot be removed from the casting after cooling, because the metal of the casting will be rigidly shrunk on the metallic core during the cooling period so as to form a unit therewith. It also frequently happens that the casting bursts when contracting around a metallic core.

The present invention has for its object to provide a hollow metallic core of permanent character which does not suffer from the drawback above referred to. The core according to the invention is characterized, essentially, by the fact that it is built up of separate segments and outwardly tapered wedges inserted between said segments which on the shrinking of the casting around the core are capable of moving inwardly with respect to the segments, thereby allowing an inward movement of the wedges and segments towards the centre of the core under the action of the shrinking to which the casting is subjected while getting cool, all with the object in view to positively preventing the casting from firmly clinging to the core due to shrinking.

In order that such a core may be mounted and act in the proper way it is necessary to keep the segments or the segments and the wedges together by means of an annular member at one end of the core to prevent them from moving outwardly at that end. The segments and the wedges are maintained in position at said end in engagement with said annular member by the action of an outwardly directed pressure produced on the wedges or both on the wedges and the segments by means of springs or in other way, said pressure being of such a nature that it can be overcome by the pressure exerted by the shrinking casting. The other end of the core may be made according to any of two different principles that is to say either in the same way as at the first mentioned end of the core, or they may be provided with an annular member acting to keep the segments and wedges in their position, and to which the segments and the wedges are pivoted.

Several embodiments are illustrated in the accompanying drawings, in which:

Fig. 1 is a side elevation of a hollow core comprising four segments and four wedges;

Fig. 2 is a longitudinal section of two oppositely positioned segments, and

Fig. 3 is a longitudinal section of two oppositely positioned wedges of said core;

Fig. 4 is a cross section along the line IV—IV of Fig. 3;

Fig. 5 is a longitudinal section of a portion of the core as inserted in a mould after a completed casting operation and while still in normal position.

Fig. 7 is a cross section along the line VII—VII of Fig. 5, and

Figs. 13–16 are longitudinal sections through modified forms of the core;

Fig. 17 is a longitudinal section of a portion of another modified embodiment of the core, and Fig. 18 is a cross section of still another embodiment of the core.

Figure 6:
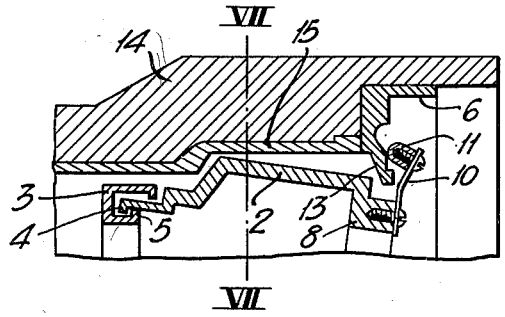
Fig. 6 is a corresponding section after contraction of the core.

In the embodiment shown in Figs. 1–12 the hollow core comprises four segments 1 and four wedges 2 interposed therebetween with their small ends facing outwardly. The segments and the wedges are held together at one end (hereinafter referred to as the front end) of the core by means of an annular member 3 formed with an annular groove in its inner end, said annular groove being engaged by end pieces of the segments and the wedges in such a way that said end pieces while in their normal position bear against the annular member both at their inner and outer peripheries but, nevertheless, are allowed to move inwardly a certain amount from said normal position, while on the other hand they are prevented from moving outwardly beyond the normal position. It is to be noted that in the normal position of the wedges and segments the core has its full normal diameter. The annular retaining member 3 is locked against axial displacement by means of inwardly projecting abutments 4 on the end pieces of the wedges, said abutments being maintained in the groove of member 3 by means of an outwardly directed flange 5 on the internal wall of said groove, as shown in Figs. 3, 5 and 6. In the embodiment shown in Fig. 3 when the segment or wedge is to be inserted it is first brought in an oblique position so that its hooked end may be inserted into the groove of the member 3.

At the other (or rear) end of the core of the embodiment shown in Figs. 1–12, the segments and wedges are held assembled by means of a cup-shaped annular member 6 the bottom of which is formed with a collar 7 resting with its inner circumference against rear projections 8 of the elements of the core. Said annular member 6 with its collar 7 is held against axial displacement with relation to the core by means of pieces of bar iron 9, Fig. 2, attached to the segments which bear against the collar 7. The wedges, on the contrary, are connected with the annular member 6 and its collar 7 by means of springs 10 attached by screws to the rear projections 8 of the wedges which carry pins 11 normally engaging an annular groove 12 formed in the bottom of the cup-shaped member 6 at a larger diameter than that of the collar 7. By the pressure exerted by these springs the wedges 2 and thus also the segments 1 are forced outwardly against the collar 7. Said collar is formed on its surface facing the core with bevelling. The surface of the collar facing the core is bevelled, as shown at 13, in order that the segments and wedges may easily slide inwardly therealong.

Figure 8:
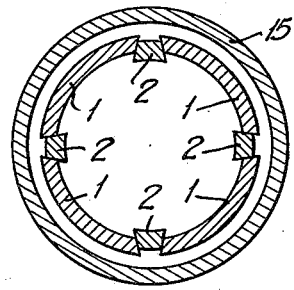
Fig. 8 is a cross section on the line VIII—VIII of Fig. 6.
Figure 9:
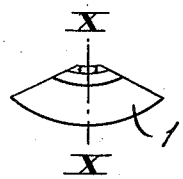
Fig. 9 is an end view of a segment of the core.
Figure 10:
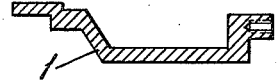
Fig. 10 is a longitudinal section of the same core along the line X—X of Fig. 9.
Figure 11:
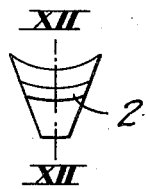
Fig. 11 is an end view of a wedge of the core.
Figure 12:
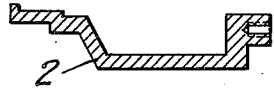
Fig. 12 is a longitudinal section of said wedge along the line XII—XII of Fig. 11.

Figs. 5, 6, 7 and 8 illustrate the use of the core in connection with the centrifugal casting of a pipe having a sleeved end in which case said sleeved end is formed around the core. In case of a pipe made, for instance, of cast iron or a similar material having a tendency to harden on casting it against a metallic core, it is advisable to heat the core and provide it with a more or less thick coating of some suitable blacking substance previous to the performance of the casting operation. The core is inserted in the centrifugal mould a portion of which is indicated at 14 in Figs. 5 and 6. When inserted in the mould the core takes up the position shown in Fig. 5. The molten iron is poured into the mould while the latter is held in rotation causing the molten iron to fill the space between the mould 14 and the core so as to form a sleeve 15 around the wider portion of the core. Said sleeve 15 stiffens around the annular set of segments 1 and wedges 2, as illustrated in Fig. 7. Immediately after getting stiff the sleeve starts contracting thereby exerting an inwardly directed pressure on the segments 1 and the wedges 2, causing said elements to move inwardly, as shown in Fig. 6, with the pins 11 sliding out of the groove 12 in member 6. By this action the wedges 2 are caused to slide inwardly with relation to the segments 1 so that the latter are allowed to draw nearer to each other while also moving inwardly, as shown in Fig. 8, thereby allowing an unimpeded contraction of sleeve 15. After the rotation of the mould 14 has come to an end, the core may be easily removed, because it is in loose engagement with the sleeve 15. After removal of the core the segments and wedges may be restored to their normal position by forcing the wedges outwards, allowing the pins 11 to again slide into the groove 12 for locking the segments and wedges in their normal positions. After blacking the core is again ready for use.

The construction of the core may be varied in many ways without departing from the principle of the invention. Figs. 13–16 show some examples of modified embodiments.

Figure 13:
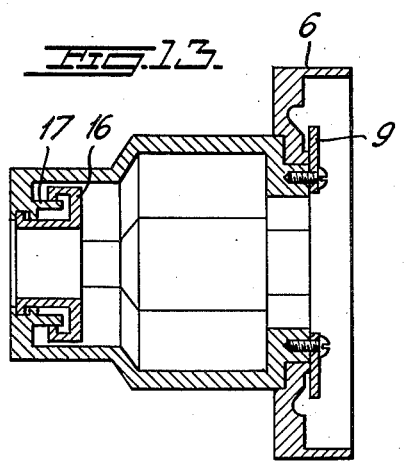

Fig. 13 shows how to replace the front retaining ring 3 of the embodiment above described by a retaining ring 16 provided inside the segments and wedges. In this case the retaining ring is formed with an annular recess in its front end engaged by rearwardly directed projections 17 of the elements of the core.

Figure 14:
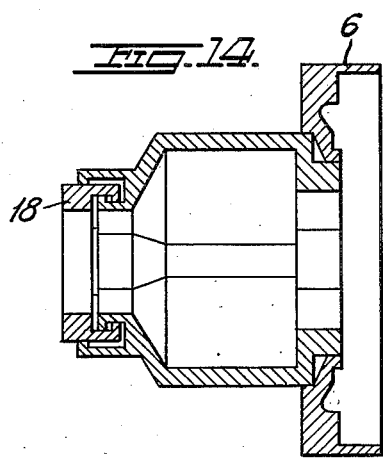

Fig. 14 shows a front retaining ring 18 engaging a forwardly opening groove formed in the segments and wedges.

Fig. 15 shows an internally provided front retaining ring 19 engaging an internal groove formed in the suitably shaped ends of the elements of the core.

In all of the modified embodiments shown in Figs. 13–15 the front retaining ring should, of course, be constructed so as to allow the inward movement of the elements of the core above referred to.

In order that after removal of the core from the casting the core may automatically return to its original shape spring devices other than those above described may be used. In Fig. 16 is shown a pair of arched blade springs 20 forming right angles to each other which tend to force the rear end pieces 8 of the wedges outwardly. In Fig. 17 coiled traction springs 21 are shown inserted between the rear end pieces 8 of the wedges and the cylindrical wall of the cup-shaped annular member 6, so that they tend to pull said end pieces outwardly. Fig. 18 shows a set of coiled pressure springs 22 inserted so that they tend to move the wedges 2 outwardly.

What I claim is:

1. A hollow core of permanent character for casting purposes comprising in combination, a set of metallic wall segments, a set of metallic wedges interposed between said wall segment with their smaller ends directed radially outwardly, said segments and said wedges forming in combination a continuous outer surface when assembled in normal relation, a ring engaged by the segments and wedges together at their one end so as to form a hinge connection allowing the wedges and segments to swing radially about said hinged connection as a fulcrum, another ring provided at the other end of the segments and wedges to maintain same in a normal circular form in combination with each other, and springs in connection with said other ring for exerting an outwardly directed pressure thereon for the purpose of maintaining the segments and wedges by a yielding force in engagement with said other ring.

2. A hollow core of permanent character for casting purposes as claimed in claim 1, and in which one ring is provided with a groove, the segments and the wedges being in engagement with said ring in said groove with their one end in such a way as to be capable of swinging radially about said engagement as a fulcrum, another ring surrounding the assembled segments and wedges at the other end so as to prevent them from moving outwardly at said ends beyond a predetermined radius, springs for acting on the wedges at said other end in order to force the wedges radially outwardly, thereby causing them to keep the segments in their outermost position until the action of the springs is overcome by the inwardly acting force resulting from contraction of the cast product undergoing cooling.

ALEXANDER BAJROVIC.

REFERENCES CITED

The following references are of record in the file of this patent:

UNITED STATES PATENTS

| Number | Name | Date |
|---|---|---|
| 2,405,254 | Hopkins | Aug. 6, 1946 |
| 2,486,870 | Nolan | Nov. 1, 1949 |